(12) United States Patent
Wendel et al.

(10) Patent No.: US 12,099,365 B2
(45) Date of Patent: Sep. 24, 2024

(54) DETERMINING AND RESPONDING TO AN INTERNAL STATUS OF A VEHICLE

(71) Applicant: Waymo LLC, Mountain View, CA (US)

(72) Inventors: Andreas Wendel, Mountain View, CA (US); Christopher Kennedy Ludwick, Los Altos, CA (US); Laurens Andreas Feenstra, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/117,873

(22) Filed: Mar. 6, 2023

(65) Prior Publication Data

US 2023/0205223 A1     Jun. 29, 2023

Related U.S. Application Data

(63) Continuation of application No. 17/068,995, filed on Oct. 13, 2020, now Pat. No. 11,619,949, which is a (Continued)

(51) Int. Cl.
*G05D 1/00* (2024.01)
*B60K 28/04* (2006.01)
(Continued)

(52) U.S. Cl.
CPC .......... *G05D 1/0246* (2013.01); *B60K 28/04* (2013.01); *B60N 2/002* (2013.01); *B60Q 9/00* (2013.01);
(Continued)

(58) Field of Classification Search
CPC .............. G05D 1/0246; G05D 1/0221; G05D 2201/0213; B60K 28/04; B60N 2/002; B60Q 9/00; G01C 21/3602
See application file for complete search history.

(56) References Cited

U.S. PATENT DOCUMENTS

| | | | |
|---|---|---|---|
| 7,796,021 B2* | 9/2010 | Saban .................... | B60N 2/002 701/29.1 |
| 7,845,560 B2 | 12/2010 | Emanuel et al. | |

(Continued)

FOREIGN PATENT DOCUMENTS

| | | |
|---|---|---|
| CN | 105667450 A | 6/2016 |
| CN | 105730392 A | 7/2016 |

(Continued)

OTHER PUBLICATIONS

International Preliminary Report on Patentability for application No. PCT/US2019/018542 dated Sep. 3, 2020.
(Continued)

*Primary Examiner* — Gertrude Arthur Jeanglaude
(74) *Attorney, Agent, or Firm* — Botos Churchill IP Law

(57) ABSTRACT

Aspects of the disclosure relate to determining and responding to an internal state of a self-driving vehicle. For instance, an image of an interior of the vehicle captured by a camera mounted in the vehicle is received. The image is processed in order to identify one or more visible markers at predetermined locations within the vehicle. The internal state of the vehicle is determined based on the identified one or more visible markers. A responsive action is identified action using the determined internal state, and the vehicle is controlled in order to perform the responsive action.

21 Claims, 10 Drawing Sheets

Related U.S. Application Data continuation of application No. 15/901,379, filed on Feb. 21, 2018, now Pat. No. 10,838,425.

(51) Int. Cl.
*B60N 2/00* (2006.01)
*B60Q 9/00* (2006.01)
*G01C 21/36* (2006.01)

(52) U.S. Cl.
CPC ....... *G01C 21/3602* (2013.01); *G05D 1/0221* (2013.01)

(56) References Cited

U.S. PATENT DOCUMENTS

| | | | |
|---|---|---|---|
| 8,605,947 | B2 | 12/2013 | Zhang et al. |
| 8,880,273 | B1 | 11/2014 | Chatham |
| 9,126,525 | B2* | 9/2015 | Lynam ................ B60W 40/02 |
| 9,650,016 | B2 | 5/2017 | Andreen |
| 9,994,150 | B2 | 6/2018 | Appukutty et al. |
| 10,416,671 | B2 | 9/2019 | Herbach |
| 10,838,425 | B2 | 11/2020 | Wendel et al. |
| 11,106,927 | B2* | 8/2021 | Reiley ...................... G08B 3/10 |
| 2005/0263992 | A1 | 12/2005 | Matsuda |
| 2008/0309493 | A1 | 12/2008 | Lee et al. |
| 2010/0222976 | A1 | 9/2010 | Haug |
| 2012/0083959 | A1 | 4/2012 | Dolgov et al. |
| 2016/0301698 | A1 | 10/2016 | Katara et al. |
| 2016/0332535 | A1* | 11/2016 | Bradley ................ G08B 21/24 |
| 2017/0228126 | A1 | 8/2017 | Kim et al. |
| 2017/0330044 | A1 | 11/2017 | Telpaz et al. |

FOREIGN PATENT DOCUMENTS

| | | |
|---|---|---|
| CN | 105946786 A | 9/2016 |
| CN | 106274669 A | 1/2017 |
| CN | 106494349 A | 3/2017 |
| CN | 106994946 A | 8/2017 |
| CN | 107031559 A | 8/2017 |
| DE | 102006040244 B3 | 8/2007 |
| DE | 102016121882 A1 | 5/2017 |
| DE | 102017109730 A1 | 11/2017 |
| FR | 2877279 A1 | 5/2006 |
| JP | 2003044863 A | 2/2003 |
| JP | 2006315586 A | 11/2006 |
| JP | 2007055294 A | 3/2007 |
| JP | 2007126141 A | 5/2007 |
| JP | 2007168668 A | 7/2007 |
| JP | 2008068742 A | 3/2008 |
| JP | 2008234009 A | 10/2008 |
| JP | 2009090962 A | 4/2009 |
| JP | 2009541888 A | 11/2009 |
| JP | 2013544697 A | 12/2013 |
| JP | 2017083308 A | 5/2017 |
| JP | 2017222337 A | 12/2017 |
| JP | 6281492 B2 | 2/2018 |
| KR | 20030082550 A | 10/2003 |
| KR | 100753115 B1 | 8/2007 |
| KR | 101478053 B1 | 12/2014 |
| WO | 2002046003 | 6/2002 |
| WO | 2017040929 A1 | 3/2017 |

OTHER PUBLICATIONS

Office Action for Japanese Patent Application No. 2020-541977 dated Dec. 25, 2020.
Office Action for Japanese Patent Application No. 2020-541977 dated Jun. 8, 2021.
Office Action for Korean Patent Application No. 10-2020-7024030 dated Nov. 16, 2020.
Republic of Korea Office Action for Application No. 10-2020-7024030 dated Mar. 10, 2021.
The Extended European Search Report for European Patent Application No. 19756994.0, dated Oct. 19, 2021.
"International Search Report and Written Opinion for Application No. PCT/US2019/018542 dated Jun. 5, 2019", 9 pages.
The First Office Action for Chinese Patent Application No. 202110670610.2, Jan. 12, 2024, 37 Pages.
Office Action for European Patent Application No. 19756994.0, Nov. 16, 2023, 5 Pages.

* cited by examiner

DETERMINING AND RESPONDING TO AN INTERNAL STATUS OF A VEHICLE

CROSS REFERENCE TO RELATED APPLICATIONS

The present application is a continuation of U.S. patent application Ser. No. 17/068,995, filed Oct. 13, 2020, which is a continuation of U.S. patent application Ser. No. 15/901,379, filed Feb. 21, 2018, now issued as U.S. Pat. No. 10,838,425, the entire disclosures of which are incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

BRIEF SUMMARY

One aspect of the disclosure provides a method of determining and responding to an internal state of a self-driving vehicle. The method includes receiving an image of an interior of the vehicle captured by a camera mounted in the vehicle; processing the image in order to identify one or more visible markers at predetermined locations within the vehicle; determining the internal state of the vehicle based on the identified one or more visible markers; identifying a responsive action using the determined internal state; and controlling the vehicle in order to perform the responsive action.

In one example, the image is processed using a machine learning model which provides the determined internal state. In another example, the method also includes using the one or more visible markers to determine a height of a passenger of the vehicle, and wherein determining the internal state of the vehicle is based on the determined height. In another example, the internal state indicates that a seat of the vehicle is occupied. In another example, the internal state of the vehicle indicates that a seat of the vehicle is unoccupied. In another example, the one or more visible markers are located on a seat back of a seat of the vehicle, and the internal state of the vehicle indicates that the seat is unoccupied. In another example, the one or more visible markers are located on a seatbelt of a seat of the vehicle, and the internal state of the vehicle indicates that the seat is occupied by a passenger. In this example, the internal state of the vehicle indicates that the passenger is wearing a seatbelt. In another example, the method also includes further comprising qualifying the determined internal state based on whether the vehicle is currently on a trip to a destination with one or more passengers. In another example, the determined internal state indicates a number of passengers within the vehicle. In another example, when the determined internal state indicates that the vehicle is occupied by a passenger and a trip has just ended, the responsive action includes providing an audible notification to the passenger to indicate that it is time to leave the vehicle. In another example, when the determined internal state indicates that the vehicle is unoccupied and a trip is in progress, the responsive action includes cancelling the trip. In another example, when the determined internal state indicates that a child is in the vehicle, the responsive action includes providing a notification that indicates that the child must be in a specific seat within the vehicle. In this example, the responsive action includes not starting a trip until the child is the specific seat of the vehicle. In another example, the determined internal state indicates that a child is in the vehicle, the responsive action includes providing a notification that indicates that the child must be in an appropriate child restraint within the vehicle. In this example, the responsive action includes not starting a trip until the child is the appropriate child restraint. In another example, the determined internal state indicates that a child is in the vehicle, the responsive action includes providing a notification to a client device of an account holders associated with the trip requesting confirmation that the child is allowed to ride in the vehicle. In another example, the determined internal state indicates that a child is in the vehicle, and the method further comprises turning off an airbag adjacent to a seat in which the child is located. In another example, the determined internal state indicates that a passenger is not wearing a seatbelt, the responsive action includes providing a notification requests that the passenger use the seatbelt.

Another aspect of the disclosure provides a system for determining and responding to an internal state of a self-driving vehicle. The system includes one or more processors configured to receive an image of an interior of the vehicle captured by a camera mounted in the vehicle; process the image in order to identify one or more visible markers at predetermined locations within the vehicle; determine the internal state of the vehicle based on the identified one or more visible markers; identify a responsive action using the determined internal state; and control the vehicle in order to perform the responsive action.

DETAILED DESCRIPTION

Overview

Figure 1:
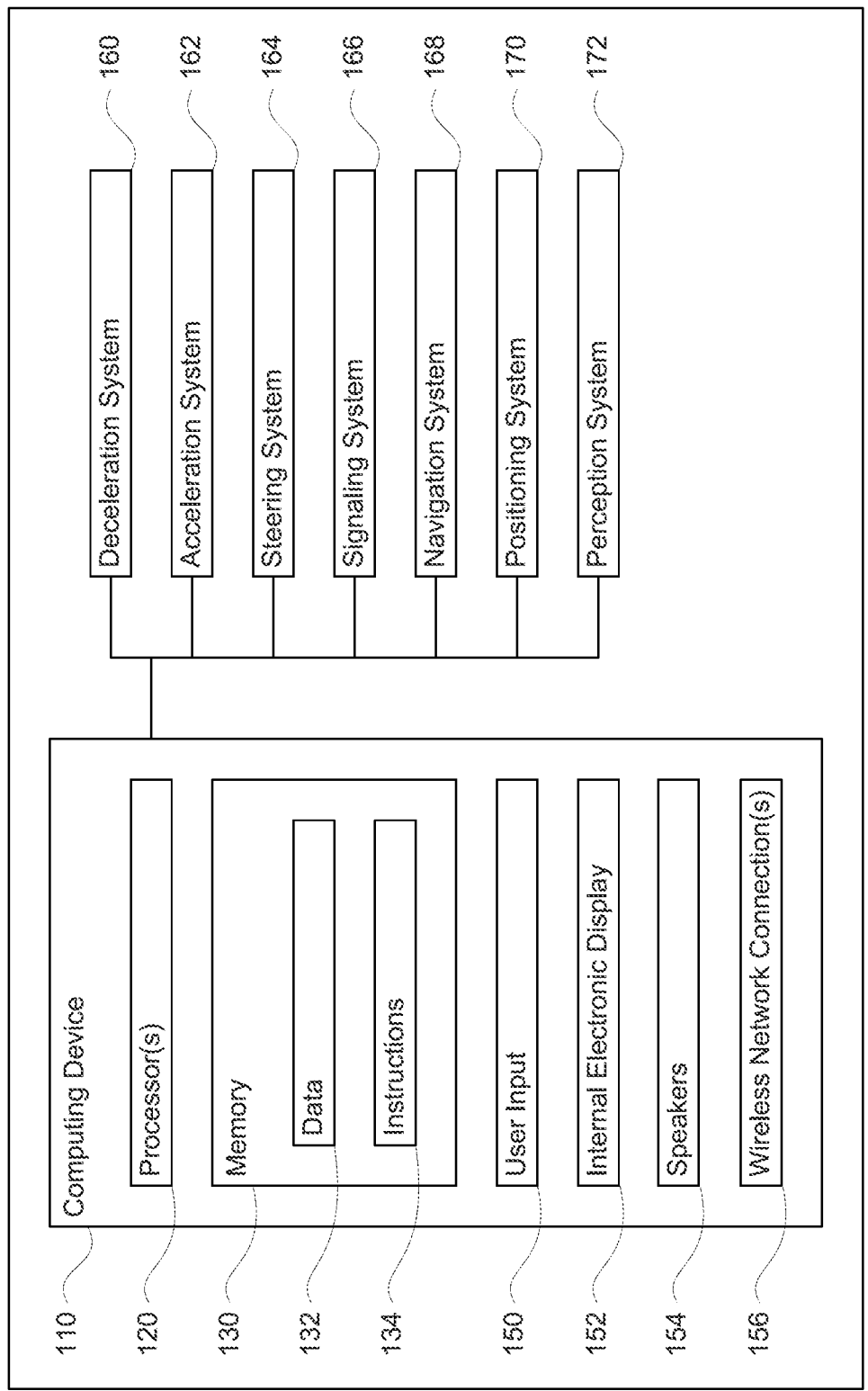
FIG. 1 is a functional diagram of an example vehicle in accordance with an exemplary embodiment.

The technology relates to automatically determining the internal state of a driverless or autonomous vehicle in the course of providing transportation services. The state may refer to whether or not the vehicle is occupied by any passengers and the characteristics of those passengers, such as height which may in some instances be used to infer age. In some instances, the internal state of the vehicle may also include the status of those passengers as well as other state information of the vehicle such as whether there are any objects such as bags or luggage in the vehicle and whether the vehicle is damaged or dirty.

Typically, for transportation services which utilize a driver, the driver is able to quickly check the status of the vehicle visually. Of course, where there is no driver, images of the interior of the vehicle may be sent to a human operator for review. While this is an effective and useful way to confirm the internal state of a driverless vehicle, there is some latency in the sending of information back and forth between the vehicle and the remote operator which can be problematic in certain situations, such as where a passenger is unbuckling his or her seatbelt and moving around the vehicle. In addition, where the vehicle is in an area where no connection can be made with the vehicle's computing devices, such as an area without cellular service, this process may become ineffective. Moreover, as the number of vehicles increases, using human operators may become inefficient.

As where there are human operators checking the internal state of the vehicle, order to make the determination of the internal state of a vehicle, one or more cameras may be mounted within the vehicle. For instance, a camera may be mounted in the front of the vehicle in the left, middle or right side of the headliner and oriented towards the rear interior of the vehicle in order to view locations where passengers are likely to be seated, or underneath the seats and into the cargo areas. These cameras may include typical visible light cameras, event based cameras, time of flight cameras and/or an infrared cameras that can capture images of the vehicle in very low light conditions, such as at night time, during inclement weather, or when the vehicle is in a tunnel or parking garage.

In order to determine the state of the vehicle using the one or more cameras, a model may be generated. For instance, various machine learning techniques such as a classifier or neural network may be trained to identify the internal state of the vehicle. Training may include labeling images of the appearance of a pristine interior of the vehicles of the fleet as empty or in a default state. To improve the usefulness of the model, the training images may include different lighting conditions, color schemes, or vehicle ages. In other words, because the appearance and shapes of shadows within the vehicle may change as the car drives in different situations, training with images including different lighting conditions may be especially useful.

In addition to images of the default state of the vehicles, images of the interior of the vehicle with passengers or other objects in different states may also be labeled according to their states and used to train the model. As an example, the labeling of images with passengers or other objects may be as simple as "occupied" whereas images of the default state may be labeled as "unoccupied." Other more complex labeling schemes may also be used in order to identify specific types of objects or the states of those objects. Additional data from sensors may be used to determine the internal state of the vehicle.

In addition or as an alternative to the models and sensors described above, markers may be placed within the vehicle in order to determine or assist in determining the state of the vehicle. These markers may include IR-reflective material for improved visibility at night. The markers may include patterns, circles, zig-zags, or other configurations arranged on the seatbacks, seat bases, and seatbelts of seats for passengers.

To determine the internal state of the vehicle, the camera or cameras may capture an image of the vehicle. The image may be processed in order to identify one or more visible markers at pre-determined locations within the vehicle. The visible markers may be compared to pattern information in order to determine state information. In this regard, the pattern information may relate state information to marker visibility. The pattern data may also be used to relate marker visibility and location to a possible height or age of a passenger as discussed further below.

Once the internal state is determined, action data may be used to address and respond to that internal state. For instance, the action data may include set of policies which may be defined by a human operator and stored in the vehicle software. These policies may define a responsive action or how the vehicle is to respond to a determined internal state of the vehicle. The action data may also include different policies depending upon the status of a trip. The vehicle may then be controlled in order to perform the responsive action.

The features described herein may allow a driverless vehicle to determine the internal state of the vehicle and effectively respond to those determinations if needed. This is especially important when there is no driver to check and a remote operator is not available to check the interior status. Moreover, by using a computing device at the vehicle, the interior status can be determined even where there is no cellular service, or in the dark. Accordingly, the process becomes much more efficient while maintaining the privacy of passengers of the vehicle, as the data is not necessarily transported out of the vehicle. This in turn, allows a self-driving vehicle to operate more effectively and reliably without human intervention.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information. As discussed further below, these pull over spots may be "hand" selected or identified areas where at which the vehicle is lawfully able to stop and park for some period of time such as shoulder areas, parking spots, parking lots, emergency pull over spots, etc.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
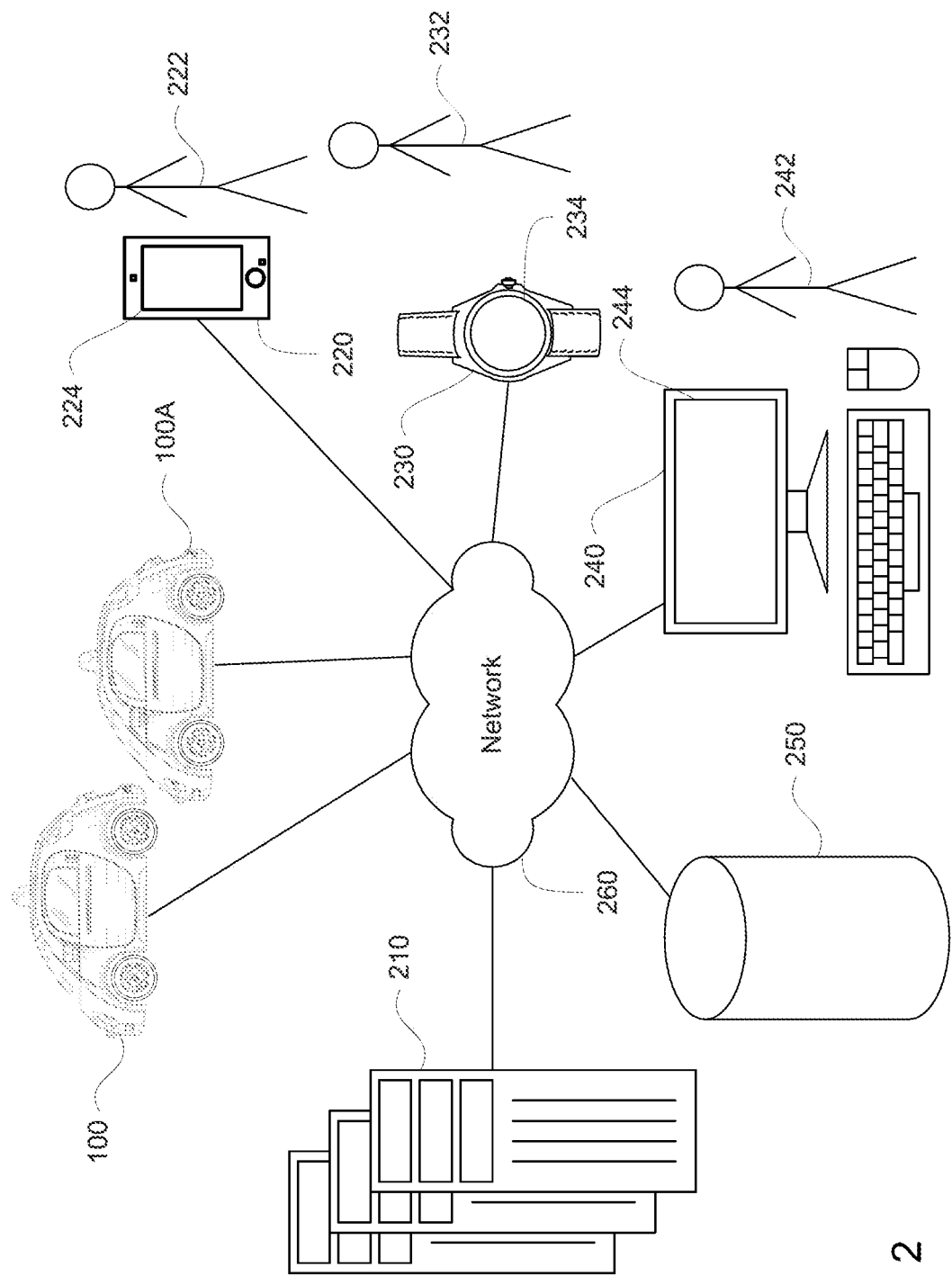
FIG. 2 is a functional diagram of an example system in accordance with aspects of the disclosure.
Figure 3:
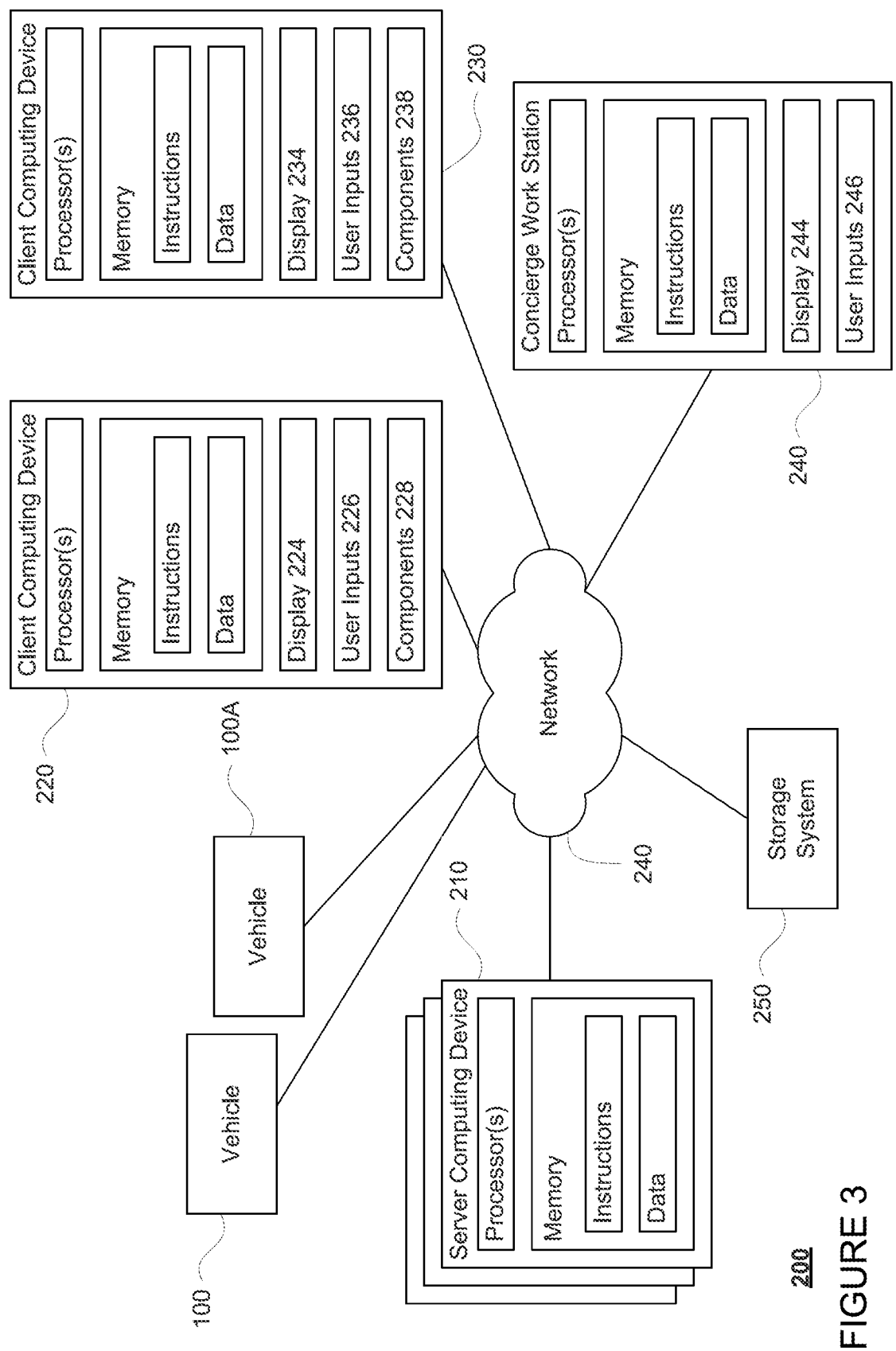
FIG. 3 is a pictorial diagram of the system of FIG. 2 in accordance with aspects of the disclosure.

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 244 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touchscreen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a wrist watch in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2 and/or may be directly connected to or incorporated into any of the computing devices 110, 210, 220, 230, 240, etc.

Vehicle 100 also includes sensors of the perception system 172.

Figure 4:
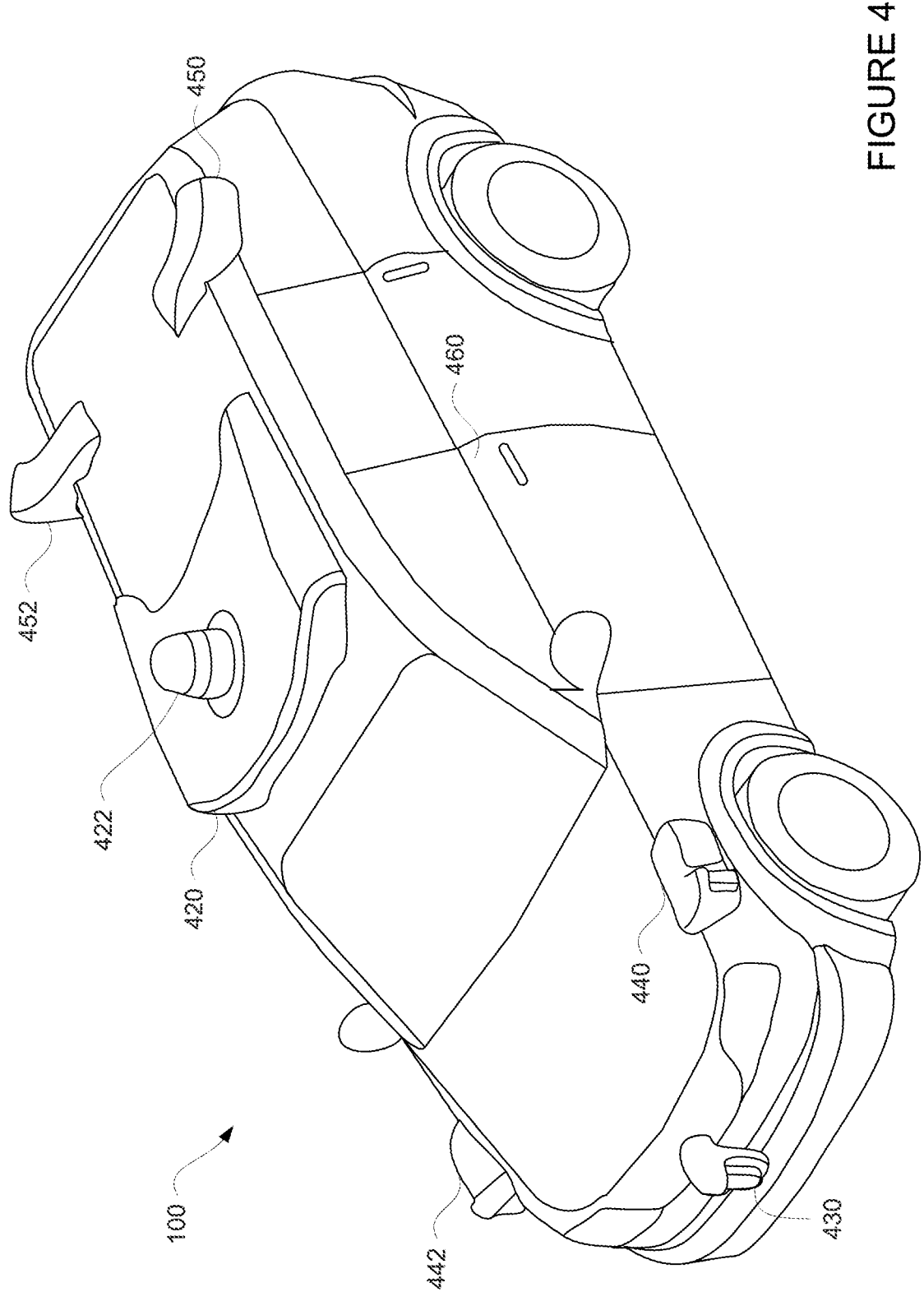
FIG. 4 is an example external view of a vehicle in accordance with aspects of the disclosure.

FIG. 4 is an example configuration for vehicle 100. In this example, roof-top housing 420 and dome housing 422 may include a lidar sensor as well as various cameras and radar units. In addition, housing 430 located at the front end of vehicle 100 and housings 440, 442 on the driver's and passenger's sides of the vehicle may each store a lidar sensor. For example, housing 440 is located in front of driver door 460. Vehicle 100 also includes housings 450, 452 for radar units and/or cameras also located on the roof of vehicle 100. Additional radar units and cameras (not shown) may be located at the front and rear ends of vehicle 100 and/or on other positions along the roof or roof-top housing 420. Each of these radar, camera, and laser sensors or devices may be associated with processing components which process data from these devices as part of the perception system 172 and provide sensor data to the computing device 110.

Figure 5:
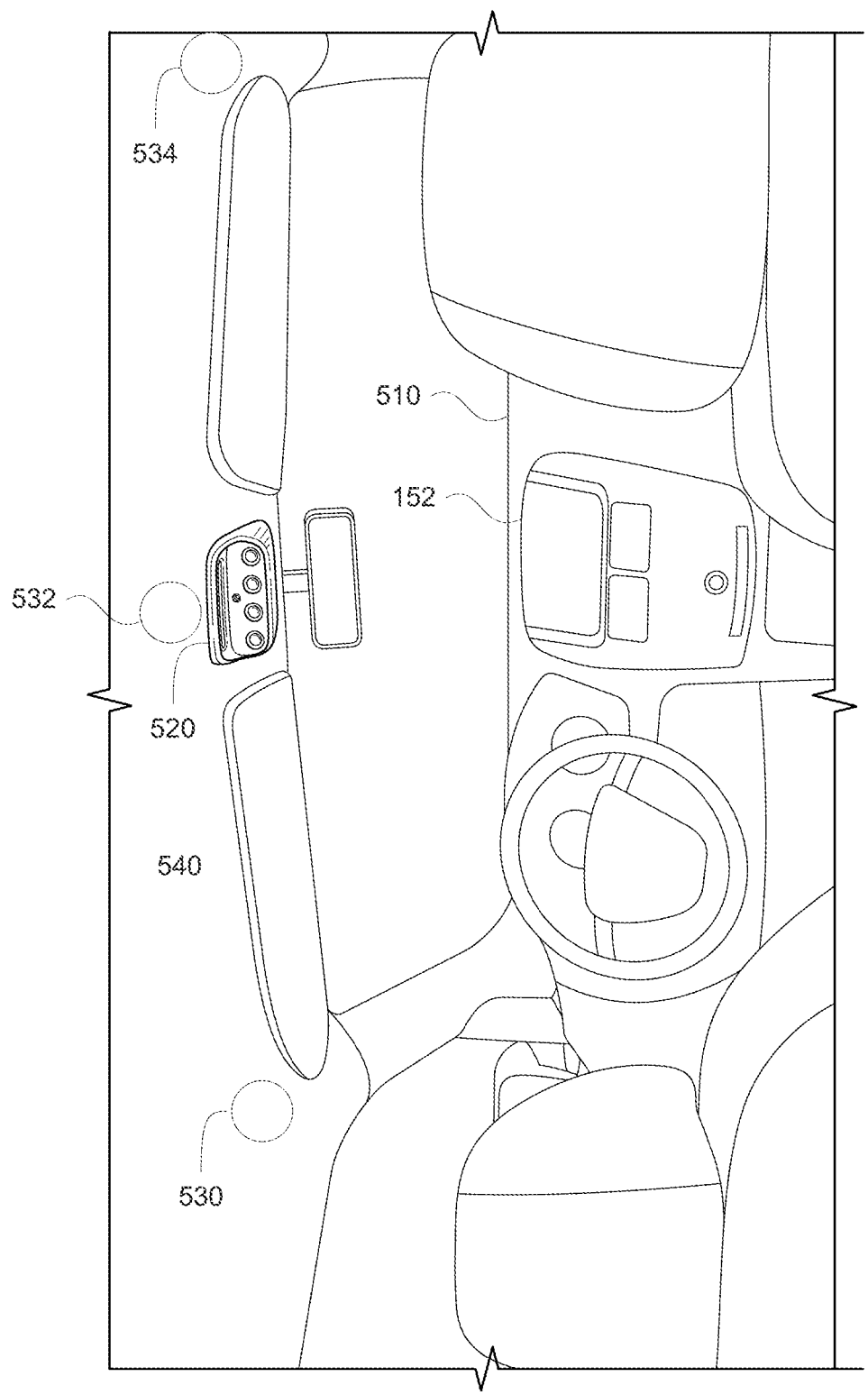
FIG. 5 is an example internal view of a vehicle in accordance with aspects of the disclosure.

FIG. 5 is an example internal view of vehicle 100, for instance in the example configuration of FIG. 4 looking towards the front of the vehicle 100. For instance, in this view, a dashboard area 510 which includes the internal electronic display 152 is visible. Although vehicle 100 includes a steering wheel, gas (acceleration) pedal, or brake (deceleration) pedal which would allow for a semiautonomous or manual driving mode where a passenger would directly control the steering, acceleration and/or deceleration of the vehicle via the drivetrain, these inputs are not necessary for the autonomous driving mode. Rather, as described in further detail below, user input is limited to a microphone of the user input 150 (not shown), features of a console 520, and wireless network connections 156. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

Figure 6:
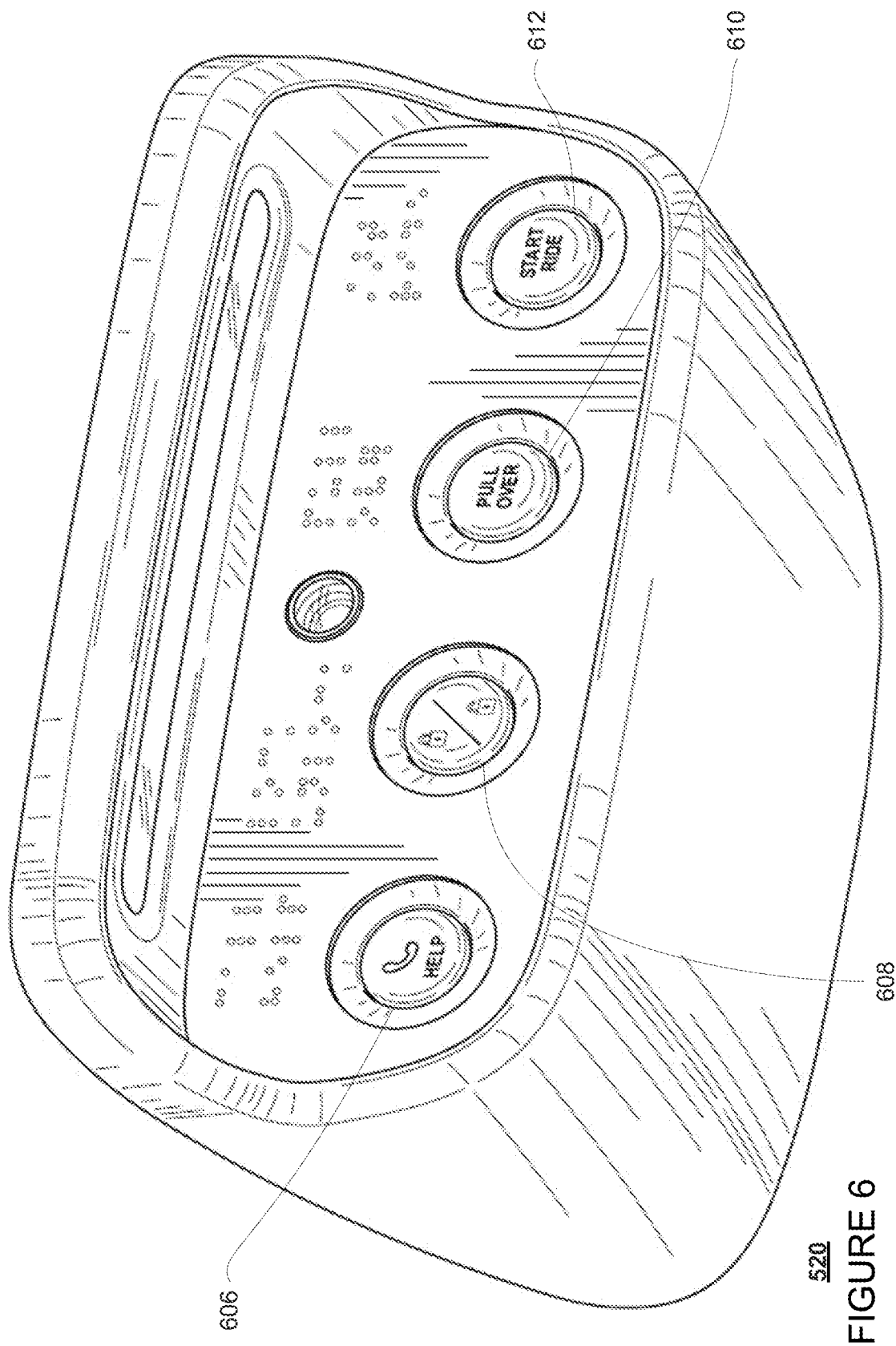
FIG. 6 is an example of a console of a vehicle in accordance with aspects of the disclosure.

FIG. 6 is a side perspective view of console 520 having a set of buttons which may be part of user input 150. This console may be used, for instance with the configuration of vehicle 100 as depicted in FIG. 4. The set of buttons in this example includes two buttons which can initiate a trip or cause the vehicle to pull over. Console 520 may be positioned on an interior of vehicle 100 at a headliner area 540 as shown in FIG. 5 (the interior surface of the roof of the vehicle). In this example, console 520 includes buttons 606, 608, 610, and 612. Each of these buttons operates to send a signal to the computing devices 110. In response to the signal from button 606, the computing devices 110 may connect the passenger with a concierge. A signal from button 608 may cause the computing devices 110 to lock or unlock the doors (depending upon the current state of the doors). Button 608 may enable a passenger to initiate a non-emergency stop. For instance, a signal from button 610 may cause the computing devices to pull the vehicle over. Button 612 may enable a passenger to initiate a trip to a destination or drop off location. For instance, a signal from button 612 may cause the computing devices to initiate a trip to a destination.

In order to make the determination of the internal state of a vehicle, one or more cameras may be mounted within the vehicle. For instance, a camera may be mounted in the front of the vehicle in the left, middle or right side of the headliner and oriented towards the rear interior of the vehicle in order to view locations where passengers are likely to be seated. For instance, FIG. 5 depicts cameras 530, 532, and 534 mounted within the headliner area 540 of vehicle 100. Other additional cameras may also be placed throughout the interior of the vehicle. For instance, referring to FIG. 8 (discussed further below) an additional camera 536 may be mounted between a middle row of seats (including seats 802 and 804) to get a useful view of a rear bench seat 806. These cameras may include typical visible light cameras, event based cameras, stereo cameras (which may provide from three-dimensional information), time of flight cameras and/or an infrared cameras that can capture images of the vehicle in very low light conditions, such as at night time, during inclement weather, or when the vehicle is in a tunnel or parking garage. In addition or alternatively, cameras may be placed in order to view areas underneath the seats and into any cargo areas.

Figure 7:
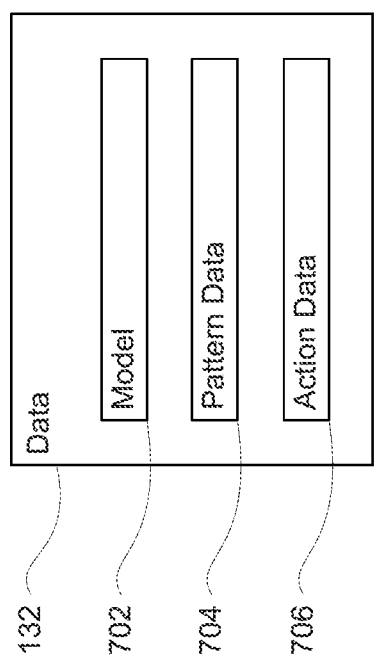
FIG. 7 is an example functional diagram of aspects of an example system in accordance with aspects of the disclosure.

In order to determine the state of the vehicle using the one or more cameras, data 132 may store a model 702 as shown in FIG. 7. The model 702 may be generated "offline" that is, ahead of time and/or at a remote computing device and sent to the vehicle 100 via network 260 and wireless network connections 156. For instance, the model may be a machine learning model, and various machine learning techniques such as a classifier or neural network may be trained to identify the internal state of the vehicle. Training may include labeling images of the appearance of a pristine interior of the vehicles of the fleet as empty or in a default state. To improve the usefulness of the model, the training images may include different lighting conditions or vehicle ages (i.e. some vehicles may eventually begin to show normal wear and tear over time). In other words, because the appearance and shapes of shadows within the vehicle may change as the car drives in different situations, training with images including different lighting conditions may be especially useful.

In addition to images of the default state of the vehicles, images of the interior of the vehicle with passengers or other objects in different states may also be labeled according to their states and used to train the model. As an example, the labeling of images with passengers or other objects may be as simple as "occupied" whereas images of the default state may be labeled as "unoccupied."

Other more complex labeling schemes may also be used in order to identify specific types of objects or the states of those objects. For instance, images may be labeled with details about passengers the number of passengers (1, 2, 3, etc.), where the passengers are sitting (i.e. which seats), whether a passenger is wearing a seatbelt, whether a passenger is not properly sitting in a seat, whether a passenger is an adult or child, whether there is an object (such as a bag or purse) between the passenger and an airbag, whether the passenger is wearing his or her seatbelt, and so on. Labels may be used for moving objects which are humans and moving objects with are not humans. Objects which are moving and not humans may be assumed to be or identified as a service animal or pet. Other labels may include whether there is personal item in the vehicle or placed in an approved luggage location. In some cases, this may also include the item's type, such as a mobile phone, bag, etc. Still other labels may correspond to the physical attributes of the vehicle itself, such as whether the seats are in the upright and forward-oriented position, vehicle is damaged, for instance, if there are rips in a seat, whether the doors are open (and in some cases, how wide), whether the cabin lights are functioning properly, and even whether the camera is working properly. In addition, in order to provide useful training images, images of actual passengers which are reviewed by remote operators may also be labeled by those remote operators for the training.

Figure 8:
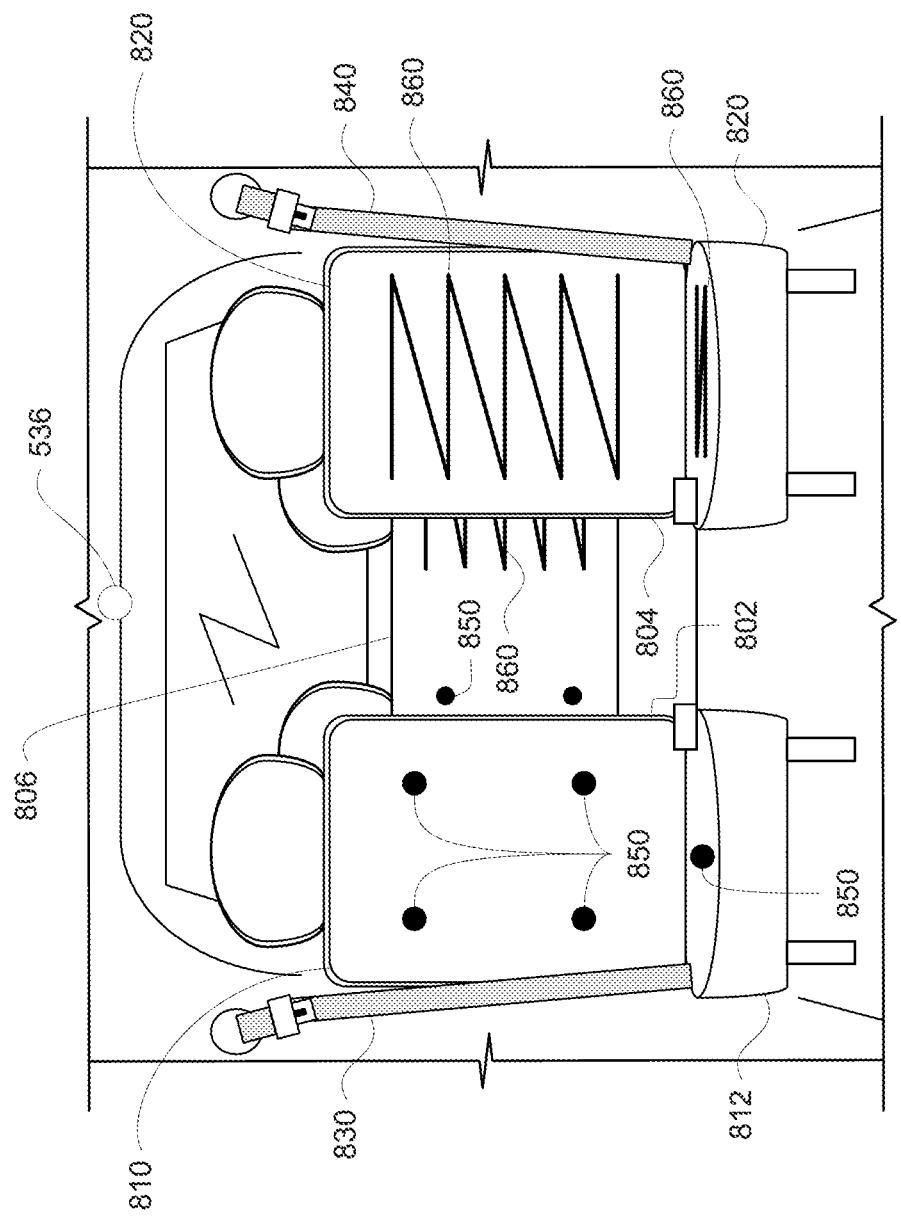
FIG. 8 is an example internal view of a vehicle in accordance with aspects of the disclosure.

In addition or as an alternative to the model and sensors described above, markers may be placed within the vehicle in order to determine or assist in determining the state of the vehicle. These markers may include IR-reflective material for improved visibility at night. FIG. 8 is an example internal view of vehicle 100, for instance in the example configuration of FIG. 4 looking towards the rear of the vehicle 100, for instance from a perspective of camera 532 of FIG. 5. In this view, seats 802, 804 as well as part of bench seat 806 are visible. Each of the seats, including the two seats of the bench seat 806, may include a fixed marker or markers. These markers may include, for instance, circles 850 as shown on seat back 810 and seat base 812 of seat 802 and part of bench seat 806, zig-zags 860 as shown on seat back 820 and seat base 822 of seat 804 and part of bench seat 806, or others patterns placed or woven on different areas of the seats of the vehicle 100. As an example, the pattern may correspond to all or part of a logo or other artwork on the seat. In this regard, the zig zags or dots may be replaced with other patterns, etc.

Figure 9:
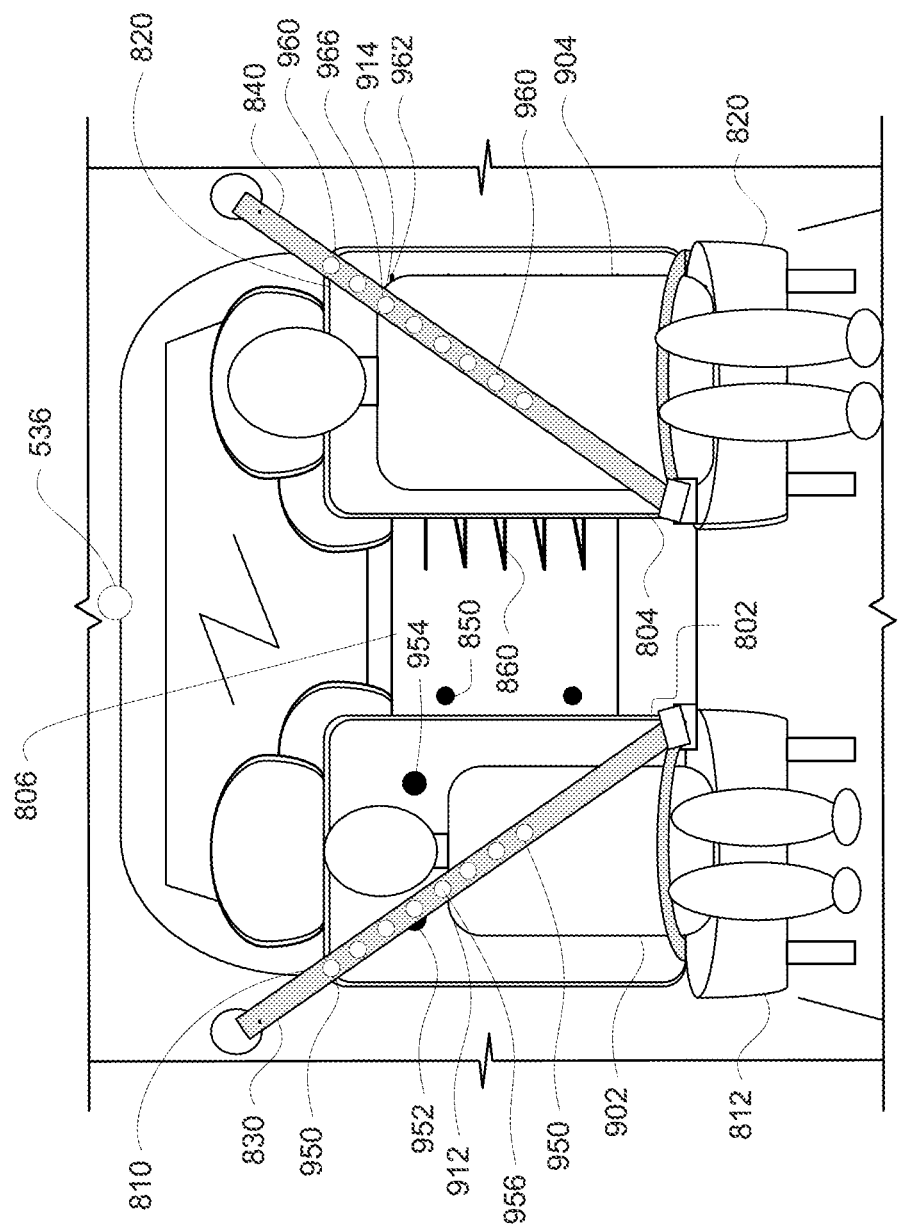
FIG. 9 is an example internal view of a vehicle in accordance with aspects of the disclosure.

Although not shown in FIG. 8 (as they are contracted within a seatbelt compartment), seatbelts 830 and 840 for seats 802 and 804, respectively (as well as the seatbelts for bench seat 806) may also include markers. For instance, as shown in FIG. 9, where seatbelts 830 and 840 are extended around passengers 902 and 904, markers 950, 960 are visible on respective seatbelts.

Data 132 may also store pattern data 704 in the form of a table, database or other storage structure. The pattern data may relate state information to marker visibility. As an example, if the markers on the seat back 810 or seat base 812 are visible in an image of the seat, it is likely that the seat is unoccupied as shown in FIG. 8. However, if only part of the marker or markers on a seat back is visible, but the rest of the markers on the seat back and seat base are not visible in the image, it is likely that the seat is occupied as discussed further below with respect to FIG. 9. Similarly, if markers located on a seatbelt are not visible in front of an occupied seat, it is likely that the passenger occupying that seat is not wearing his or her seatbelt as discussed further below with respect to FIG. 9. As an example, markers may be placed on a seatbelt in such a way that part of the seatbelt may be partly obscured from a camera's perspective by body parts, clothing, bags or hand-held items and the markers may still be captured in an image such that to allow for detection of the use of the seatbelt. For instance, redundant markers may be placed along the entire length (or usable length) of the belt, on one or both of shoulder and lap portions, such that only part of the belt or one or more of the markers needs to be visible for successful detection of a passenger wearing his or her seatbelt. The pattern data may also be used to relate marker visibility and location to a possible height or age of a passenger as discussed further below. Alternatively, rather than storing a table or database of pattern further training the model as described above using labeled images of the pattern and the seats in different states, that is with passengers of different heights, weights, positions, etc. The markers can additionally be on the seat cushion (back and base) such that the system can determine which parts of the seat are covered. The markers would be dense enough that small objects would obscure multiple points. For example, the system could determine that a mobile phone was left on the seat based on the size of the pattern of obscured markers.

Data 132 may also store action data 706 in the form of a table, database or other storage structure. For instance, in order to address and respond to a determined internal state of the vehicle, the action data may include set of policies which may be defined by a human operator. These policies may define how the vehicle is to respond to a determined internal state of the vehicle. For instance, if a minor is in the vehicle, the account holder who arrange the trip may be notified, an airbag adjacent to where the minor is sitting may be turned off (if appropriate), a notification may be played to indicate that a trip will not start until the child is placed in an appropriate seat, such as in a middle seat, in an appropriate restraint, such as a booster or a child's car seat, and that the child is properly buckled into the seat. As another example, if the only passenger is a minor or child, a concierge and/or the account holder may be notified in order to confirm that the child is allowed to or is old enough to ride by his or herself. The concierge may be provided with an image of the interior of the vehicle in order and assess the safety of the situation and intervene as needed, for example by causing the car to pause it's trip, or by contacting the minor passenger or the account holder.

The action data may also include different policies depending upon the status of a trip. For instance, if the vehicle is unoccupied, but the vehicle is on a trip, the trip may be cancelled. If the vehicle is occupied, but a trip has just ended, the computing devices may attempt to notify the occupant that he or she must leave the vehicle, request emergency services, or request assistance from a remote operator. If a trip is in progress, but a passenger removes a seatbelt or vacates a seat, this may be cause to pull over immediately (if not already in progress), contact a concierge to assess the situation, etc. As another example, if there is an occupant who is identified as a minor, and a drop off point is occupied, the vehicle may contact an account holder (directly and/or via the server computing devices 410) to check whether another location would be appropriate to drop off the minor. Similarly, if there is an occupant who is identified as a minor, trip changes within the vehicle may not be allowed or an account holder might get a notification if the minor hits a "pull over" button, such as button 608. All or some of these responses could be cross-validated using different sensors in the car, such using images from one or more of the internal cameras and/or a seatbelt sensor of the vehicle.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to initiate a trip from a pickup location to a destination location, the server computing devices 410 may send this information, for instance as dispatching instructions, over network 260 to the computing devices 110. The computing devices 110 may use the information from server computing devices 410 maneuver the vehicle towards the pickup location as discussed above. Once the vehicle is some predetermined distance from the pickup location, the computing devices 110 may attempt to stop the vehicle at a location proximate to the pickup location in order to allow the passenger to enter. Similarly, the computing device 110 may maneuver the vehicle towards the destination location and attempt to stop the vehicle at a location proximate to the destination location in order to allow the passenger to exit. At all times, before, during and after the trip, the computing devices may determine the internal state of the vehicle and cause the vehicle to respond as needed.

In order to determine the internal state of the vehicle, a camera, such as any of cameras 530-536, may be used to capture an image of the interior of the vehicle 100. For instance, camera 532 may capture an image corresponding to the views of FIG. 8 or 9 and send the image to the computing devices 110 for further processing. The images may be captured periodically, such as every 5 seconds or more or less, which may change, for instance, depending upon whether the vehicle is currently on a trip. In that regard, immediately prior to, during, or immediately after a trip, images may be captured more often than when the vehicle is not currently on a trip, and the vehicle should be empty of passengers.

In one example, the image may be processed using the model described above. For instance, the image may be input into the model which may output information according to the types of information used to train the model. This output information may correspond to determined state information for the interior of the vehicle or a determined interior state of the vehicle. For instance, the output may include details about passengers the number of passengers (1, 2, 3, etc.), where the passengers are sitting (i.e. which seats), whether a passenger is not properly sitting in a seat, whether the passenger is wearing a seatbelt, whether a passenger is an adult or child, whether there is an object (such as a bag or purse) between the passenger and an airbag, whether the passenger is wearing his or her seatbelt, whether there is a service animal or pet present, whether there is personal item in the vehicle or placed in an approved luggage location, whether the seats are in the upright and forward-oriented position, vehicle is damaged, for instance, if there are rips in a seat, whether the doors are open (and in some cases, how wide), whether the cabin lights are functioning properly, whether the camera is working properly. With regard to personal items, the output may also include the item's type, such as a mobile phone, bag, etc.

As another example, the image may be processed by the computing devices 110 to determine the visibility of the markers, or rather, which markers are visible in the image. This processing may (or may not) include using one or more trained classifiers to crop the image into salient parts (such as those corresponding to a seat) and detect the presence of markers in the image. The output of this may be input into another classifier which may use the presence and/or pattern of markers in the cropped or uncropped image to identify the status of each seat. This may include whether the seat is occupied, whether an occupant of the seat is wearing his or her seatbelt, and so on. If more than one seat is depicted in the image, the output may include the aforementioned information for each seat or may be more generic, such as "image contains 2 people, one with seatbelt, one without."

For instance, turning to FIG. 8, all of the markers 850 and 860 are visible, but none of the markers of the seatbelts 830 or 840. Turning to FIG. 9, passenger 902 is blocking all but one of the markers 850 of seat 802. Only two are visible, including marker 952, and one, marker 952, is partially occluded by seatbelt 830. All of the markers 950 of seatbelt 830 are visible. Passenger 904 is blocking almost all of the zigzag markers 860 of seat 804, with the exception of a small area corresponding to the marker 962 of the zigzag markers 860. All of the markers 960 of seatbelt 840 are visible.

The pattern data 704 may then be accessed and used by the computing devices 110 to determine the state information for the interior of the vehicle. For instance, the state information may indicate whether a particular seat is occupied, and whether an occupant of an occupied seat is wearing a seatbelt. This may be used to make determinations about whether the vehicle is occupied, a number of passengers seated in the vehicle, whether passengers are wearing their seatbelts, whether there are too many passengers in the vehicle, and so on. As an example, returning to FIG. 8, the information that all markers 850 are visible and that the markers of seatbelt 830 are not visible may be compared to the pattern data 704. The pattern data may identify this combination of visible and occluded markers as being associated with seat 802 being unoccupied by a passenger and seatbelt 830 not being in used. Similarly, the information that all markers 860 are visible and that the markers of seatbelt 840 are not visible may be compared to the pattern data 704. The pattern data may identify this combination of visible and occluded markers as being associated with seat 804 being unoccupied by a passenger and seatbelt 840 not being in used.

Turning to FIG. 9, the information that all markers but marker 952 and 954 are visible and marker 952 is partially occluded may be compared to the pattern data 704. The pattern data may identify this combination of visible and occluded markers as being associated with seat 802 being occupied by a passenger. Similarly, the information that zigzag markers 860 of seat 804, with the exception of a small area corresponding to marker 962 of the zigzag markers 860, is occluded, may be compared to the pattern data 704. The pattern data may identify this combination of visible and occluded markers as being associated with seat 804 being occupied by a passenger. Although not depicted in the figures, if the markers 950 or 960 were not visible in the image, this may indicate that passengers 902 and 904 were not wearing their seatbelts.

In addition to determining whether or not a seat is occupied and whether a passenger is wearing a seatbelt, the computing devices 110 may also use the markers to determine the height of a passenger. For instance, which marker on a seatbelt is visible in an image may be used to estimate where the seatbelt falls on a passenger's shoulder and/or with respect to the seat. For instance, a classifier or other vision algorithms may be used to detect the edge of a passenger's shoulder and compare that location to known seatbelt marker positions as well as the relative position of those seatbelt marker positions with respect to the seat in the image. In addition or alternatively, another classifier may detect the locations of different body features and compare the locations of those features to where the seatbelt marker or makers are positioned. In addition, the edge of the seat may be estimated using the markers of the seats or known a priori. This can be measured one time in advance (assuming the position o the seat remains relatively stationary) or several times to capture several different possible locations where the edge of the seat might be located in an image. This in turn, may be used to estimate a height of the passenger or more simply, the length of the passenger's torso. For instance, the lowest visible marker (on the seat near the seatbelt and the passenger's shoulder) may correspond to the height of the passenger (or at least the height of the passenger to his or her shoulder). Similarly, the makers themselves may have information encoded into them, such as a particular color, shape variation, or other configuration. In this regard, the lowest visible marker (on the seat near the seatbelt and the passenger's shoulder) may be directly associated with an estimated height of the passenger. Also by determining height with respect to the position on the seat in combination with the markers, this may reduce the likelihood of errors caused by different body shapes (because the seatbelt markers may end up in different positions).

For instance, seatbelt 830 has eight markers 950. Marker 956 is adjacent to passenger 902's shoulder 912. The location of marker 956 on the seatbelt 830 and relative to the other markers 950 of the seatbelt as well as to the seat 810 may be used to determine that passenger 902 is under five feet tall. This may indicate that the passenger 902 is a child. Similarly, seatbelt 840 has eight markers 960. Marker 966 is adjacent to passenger 904's shoulder 914. The location of marker 966 on the seatbelt 840 and relative to the other markers 960 of the seatbelt as well as to the seat 820 may be used to determine that passenger 902 is over 5.5 feet tall. This may indicate that the passenger 902 is an adult.

In some instances, where a child's car seat is position in the vehicle, markers may also be placed on the car seat in order to ensure that the car seat is present and properly positioned with respect to the seat. These markers may be the same or similar to those described above, and may be identified using any of the examples described above.

In addition to or as an alternative to markers, the seatbelts themselves may be colors other than black. For instance, a typical black seatbelt may be difficult to distinguish from a black sweater or jacket. In this regard, the seatbelt may be made of red, yellow, pink, green, blue, indigo, violet fabrics instead of the typical black. This may improve the effectiveness of determining whether a passenger is wearing a seatbelt using the model or other image processing to identify the particular color in the areas of a passenger's torso or lap.

The determined internal state (determined, for instance, using any of the model and/or marker examples above) may be further qualified by other information which can be used to determine how to respond to the determined internal state. For instance, depending upon the status of a trip, one has just ended, one is about to start, or one is going on in a vehicle presently, the computing devices 110 may make further determinations about the internal state of the vehicle. For instance, if a trip has just ended, and a personal item is located in the vehicle, the computing devices may determine that the personal item has been left behind. Of course, if this same personal item is in the vehicle during a trip, then the item would not necessarily have been left behind. As another example, if the trip has ended, but a passenger is still seated in the vehicle, this may again require a different response than if a trip is currently in progress and the passenger is seated.

In some examples, sensors within one or more of the seats may be used to determine whether an object is located on any of these seats. If so, the computing devices 110 may use the model and/or markers to determine the type of the object, such as whether it is an adult, child, mobile phone, bag, etc.

Once the internal state of the vehicle is determined, and in some cases qualified as discussed above, the computing devices 110 may determine an appropriate response using the action data 706. As an example, if the status of the vehicle indicates that the vehicle is occupied and a trip has just ended, the computing devices may provide an audible notification to the passenger to indicate that it is time to leave. If the passenger does not leave, the computing device may request assistance from a remote operator or emergency services (if the person is unresponsive, etc.).

In addition, using the estimated height of a passenger, the computing devices 110 may enforce rules regarding whether a passenger is tall enough or really, old enough to ride in the vehicle alone, to ride in the vehicle without a booster seat or car seat. For instance, when the determined internal state indicates that there is a minor or child in the vehicle, such as passenger 902, the computing devices may enforce the policies defined in the action data discussed above. As an example, if a minor is in the vehicle, the account holder who arrange the trip may be notified, an airbag adjacent to where the minor is sitting may be turned off (if appropriate), a notification may be played to indicate that a trip will not start until the child is placed in an appropriate seat, such as in a middle seat, in a booster or a child's car seat and that the child is properly buckled into the seat. As another example, if the only passenger is a child, the account holder may be notified, for instance, by sending a notification to his or her client computing device, in order to confirm that the child is allowed to or is old enough to ride by his or herself.

As another example, the determined internal state indicates that a personal item is left behind, a notification may be provided by the computing devices 110 via the passenger's client computing device, and if the device was left in the vehicle, an audible notification (such as a honk or other message over a speaker) may be provide in order to alert the passenger. The notification may be sent by the computing device 110 over the network directly to the client computing device, to the server computing devices 210 which may forward the notification to the client computing devices, or using any other method. The notification may allow a passenger to realize that something was left behind and retrieve it much faster than if a remote operator was involved and several messages had to be sent back and forth over a network.

As a further example, if the determined internal state indicates that the vehicle is damaged, dirty or otherwise needs to be cleaned or fixed, depending upon the amount of the damage, the computing devices 110 may put the vehicle out of service and require the vehicle to return to a service station. If the damage is minor, the vehicle may continue to provide transportation services. If the amount of damage is unclear, or in some instances where there is any damage, the same image or another image may be sent to a remote operator for review to determine how to proceed.

In certain situations, the computing devices 110 may provide notifications to a passenger to indicate a problem which the passenger must resolve before the vehicle can proceed. For instance, a passenger may be required to close a door, fasten his or her seatbelt, move an object between the passenger and an airbag, remove a non-service animal (if pets are not allowed), etc.

During a trip, the computing devices 110 may also periodically or continuously monitor the interior state of the vehicle. This may include determining whether passengers are sleeping, are attempting to tamper with or remove parts of the vehicle, have an unrestrained pet, have unbuckled a seatbelt, and/or have gotten out of a seat. The computing devices may even be able to determine if an object outside of the vehicle, such as a branch or part of a person is extending into the vehicle through a window. This can allow the computing devices to respond to such situations which would otherwise require constant review by a human operator which as indicated above can become inefficient, and may even improve privacy for passengers as there would be almost no need a remote operator to view images of the passengers, unless for instance there is some safety concern. Over time, the model may even be trained to detect whether a passenger is in distress or whether they are experiencing motion sickness, and allow the computing devices to reroute the vehicle and/or request appropriate assistance if needed.

Figure 10:
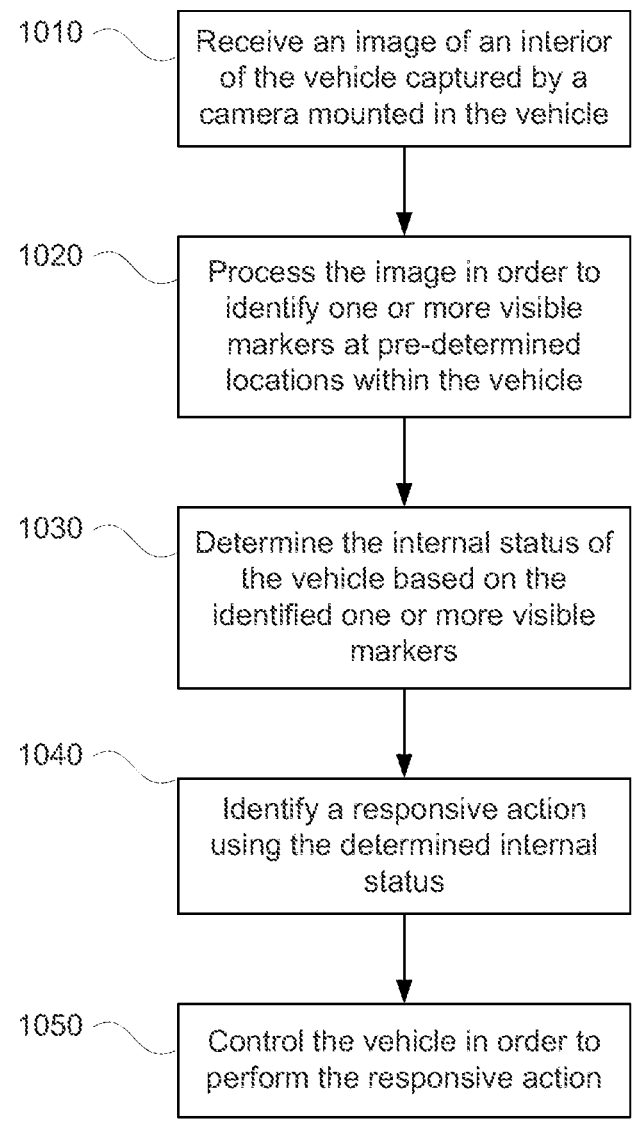
FIG. 10 is an example flow diagram in accordance with aspects of the disclosure.

FIG. 10 is an example flow diagram 1000 in accordance with aspects of the disclosure which may be performed by one or more processors of one or more computing devices, such as processors 120 of computing devices 110, in order to determine and respond to an internal state of a self-driving vehicle such as vehicle 100. In this example, an image of an interior of the vehicle captured by a camera mounted in the vehicle is received at block 1010. The image is processed in order to identify one or more visible markers at predetermined locations within the vehicle at block 1020. The internal state of the vehicle is determined based on the identified one or more visible markers at block 1030. A responsive action is identified using the determined internal state at block 1040. The vehicle is controlled in order to perform the responsive action at block 1050.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    after a trip taken by one or more passengers in a vehicle has ended, receiving, by one or more processors of the vehicle, sensor data generated by one or more sensors within the vehicle, wherein the sensor data includes captured images;
    inputting, by the one or more processors, the captured images into a model stored in memory, the model having been trained using images of an unoccupied interior of one or more vehicles;
    determining, by the one or more processors, an internal state of the vehicle based on information output by the model; and
    when the internal state of the vehicle is determined to indicate that an object has been left behind in the vehicle, identifying, by the one or more processors, a responsive action to alert that the object was left behind in the vehicle.

2. The method of claim 1, further comprising:
    determining, by the one or more processors, whether the object is located on any seat of the vehicle.

3. The method of claim 2, wherein the one or more sensors within the vehicle includes seat sensors, and wherein whether the object is located on any seat of the vehicle is determined based on the seat sensors.

4. The method of claim 1, further comprising determining, by the one or more processors, an object type of the object.

5. The method of claim 4, wherein the object type is a person or a personal item.

6. The method of claim 1, wherein the responsive action includes sending a notification to a client computing device associated with an account holder to alert that the object was left behind in the vehicle.

7. The method of claim 6, wherein the responsive action includes providing an audible notification over a speaker, the audible notification including a message.

8. The method of claim 1, further comprising:
    determining, by the one or more processors, the object is located on a seat of the vehicle; and
    identifying an object type of the object using a pattern of markers associated with the seat.

9. The method of claim 1, wherein the images of the unoccupied interior of the one or more vehicles include images captured under different lighting conditions.

10. A system comprising:
    one or more sensors; and
    one or more processors configured to:
        after a trip taken by one or more passengers in a vehicle has ended, receive sensor data generated by the one or more sensors, wherein the sensor data includes captured images;
        input the captured images into a model stored in memory, the model having been trained using images of an unoccupied interior of one or more vehicles; determine an internal state of the vehicle based on information output by the model; and
        when the internal state of the vehicle is determined to indicate that an object has been left behind in the vehicle, identify a responsive action to alert that the object was left behind in the vehicle.

11. The system of claim 10, further comprising:
    determining, by the one or more processors, whether the object is located on any seat of the vehicle.

12. The system of claim 10, further comprising the vehicle.

13. The system of claim 12, wherein the one or more sensors are internal to the vehicle.

14. The system of claim 13, wherein the one or more sensors include seat sensors, and wherein the one or more processors are further configured to determine whether the object is located on any seat of the vehicle based on the seat sensors.

15. The system of claim 10, wherein the one or more processors are further configured to determine an object type of the object.

16. The system of claim 15, wherein the object type is a person or a personal item.

17. The system of claim 10, wherein the responsive action includes sending a notification to a client computing device associated with an account holder to alert that the object was left behind in the vehicle.

18. The system of claim 10, wherein the responsive action includes providing an audible notification over a speaker, the audible notification including a message.

19. The system of claim 10, wherein the one or more processors are further configured to:
   determine that the object is located on a seat of the vehicle; and
   identify an object type of the object using a pattern of markers associated with the seat.

20. A non-transitory computer readable medium on which instructions are stored, the instructions being configured to perform a method comprising:
   after a trip taken by one or more passengers in a vehicle has ended, receiving sensor data generated by one or more sensors within the vehicle, wherein the sensor data includes captured images;
   input the captured images into a model stored in memory, the model having been trained using images of an unoccupied interior of one or more vehicles;
   determining an internal state of the vehicle based on information output by the model; and
   when the internal state of the vehicle is determined to indicate that an object has been left behind in the vehicle, identifying a responsive action to alert that the object was left behind in the vehicle.

21. The medium of claim 20, wherein the method further comprises:
   determine that the object is located on a seat of the vehicle; and
   identify an object type of the object using a pattern of markers associated with the seat.

\* \* \* \* \*